United States Patent
Chiu et al.

(10) Patent No.: US 6,984,935 B2
(45) Date of Patent: Jan. 10, 2006

(54) METHOD FOR PRECISE MOLDING AND ALIGNMENT OF STRUCTURES ON A SUBSTRATE USING A STRETCHABLE MOLD

(75) Inventors: Raymond C. Chiu, Woodbury, MN (US); Timothy Lee Hoopman, River Falls, WI (US); Paul Edward Humpal, Stillwater, MN (US); Vincent Wen-Shiuan King, Woodbury, MN (US); Kenneth R. Dillon, White Bear lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 11 days.

(21) Appl. No.: 10/936,420

(22) Filed: Sep. 8, 2004

(65) Prior Publication Data

US 2005/0029942 A1    Feb. 10, 2005

Related U.S. Application Data

(60) Continuation of application No. 10/626,285, filed on Jul. 24, 2003, now Pat. No. 6,802,754, which is a continuation of application No. 09/972,655, filed on Oct. 5, 2001, now Pat. No. 6,616,887, which is a continuation of application No. 09/779,207, filed on Feb. 8, 2001, now Pat. No. 6,325,610, which is a division of application No. 09/219,803, filed on Dec. 23, 1998, now Pat. No. 6,247,986.

(51) Int. Cl.
*H01J 17/49* (2006.01)
(52) U.S. Cl. .......................... 313/582; 31/587; 445/24
(58) Field of Classification Search ................ 313/582, 313/583, 584, 586, 587; 445/24, 25
See application file for complete search history.

(56) References Cited

U.S. PATENT DOCUMENTS

| | | | |
|---|---|---|---|
| 3,689,346 A | 9/1972 | Rowland | |
| 3,811,814 A | 5/1974 | Earle et al. | |
| 3,816,043 A | 6/1974 | Snelling et al. | |
| 4,026,714 A | 5/1977 | Lewis | |
| 4,322,576 A | 3/1982 | Miller et al. | |
| 4,336,220 A | 6/1982 | Takahashi | |
| 4,536,435 A | 8/1985 | Utsumi et al. | |
| 4,554,259 A | 11/1985 | Franklin et al. | |
| 4,617,279 A | 10/1986 | Manabe et al. | |
| 4,640,900 A | 2/1987 | Kokubu et al. | |
| 4,808,983 A | 2/1989 | Benjamin et al. | |
| 4,857,420 A | 8/1989 | Maricle et al. | |
| 4,867,935 A | 9/1989 | Morrison, Jr. | |

(Continued)

FOREIGN PATENT DOCUMENTS

EP    0802170 A2    10/1997

(Continued)

*Primary Examiner*—Mariceli Santiago
(74) *Attorney, Agent, or Firm*—Carolyn A. Fischer

(57) ABSTRACT

A method for molding and aligning microstructures on a patterned substrate using a microstructured mold. A slurry containing a mixture of a ceramic powder and a curable fugitive binder is placed between the microstructure of a stretchable mold and a patterned substrate. The mold can be stretched to align the microstructure of the mold with a predetermined portion of the patterned substrate. The slurry is hardened between the mold and the substrate. The mold is then removed to leave microstructures adhered to the substrate and aligned with the pattern of the substrate. The microstructures can be thermally heated to remove the binder and optimally fired to sinter the ceramic powder.

19 Claims, 3 Drawing Sheets

U.S. PATENT DOCUMENTS

| | | |
|---|---|---|
| 4,975,104 A | 12/1990 | Kim |
| 5,004,950 A | 4/1991 | Lee |
| 5,011,391 A | 4/1991 | Kawasaki et al. |
| 5,037,723 A | 8/1991 | Hwang |
| 5,116,704 A | 5/1992 | Kwon |
| 5,136,207 A | 8/1992 | Miyake et al. |
| 5,205,770 A | 4/1993 | Lowrey et al. |
| 5,209,688 A | 5/1993 | Nishigaki et al. |
| 5,247,227 A | 9/1993 | Park |
| 5,268,233 A | 12/1993 | Heller et al. |
| 5,342,563 A | 8/1994 | Quinn et al. |
| 5,352,478 A | 10/1994 | Miyake et al. |
| 5,484,314 A | 1/1996 | Farnworth |
| 5,509,840 A | 4/1996 | Huang et al. |
| 5,527,624 A | 6/1996 | Higgins et al. |
| 5,538,674 A | 7/1996 | Nisper et al. |
| 5,581,876 A | 12/1996 | Prabhu et al. |
| 5,585,428 A | 12/1996 | Quinn et al. |
| 5,601,468 A | 2/1997 | Fujii et al. |
| 5,629,583 A | 5/1997 | Jones et al. |
| 5,658,832 A | 8/1997 | Bernhardt et al. |
| 5,667,418 A | 9/1997 | Fahlen et al. |
| 5,672,460 A | 9/1997 | Katoh et al. |
| 5,703,433 A | 12/1997 | Fujii et al. |
| 5,707,267 A | 1/1998 | Hayashi |
| 5,714,840 A * | 2/1998 | Tanabe et al. ............... 313/581 |
| 5,725,407 A | 3/1998 | Liu et al. |
| 5,747,931 A | 5/1998 | Riddle et al. |
| 5,776,545 A | 7/1998 | Yoshiba et al. |
| 5,840,465 A | 11/1998 | Kakinuma et al. |
| 5,853,446 A | 12/1998 | Carre et al. |
| 5,854,152 A | 12/1998 | Kohli et al. |
| 5,854,153 A | 12/1998 | Kohli |
| 5,909,083 A * | 6/1999 | Asano et al. ............... 313/584 |
| 6,140,759 A * | 10/2000 | Sreeram et al. ............. 313/586 |
| 6,247,986 B1 | 6/2001 | Chiu et al. |
| 6,306,948 B1 | 10/2001 | Yokoyama et al. |
| 6,322,736 B1 | 11/2001 | Bao et al. |
| 6,325,610 B2 | 12/2001 | Chiu et al. |
| 6,616,887 B2 | 9/2003 | Chiu et al. |

FOREIGN PATENT DOCUMENTS

| | | |
|---|---|---|
| EP | 0802170 A3 | 10/1997 |
| EP | 0 836 892 A2 | 4/1998 |
| EP | 0 855 731 A1 | 7/1998 |
| EP | 866 487 | 9/1998 |
| EP | 2 764 438 | 11/1998 |
| JP | 1-137534 | 5/1989 |
| JP | 3-54569 | 3/1991 |
| JP | 6-293191 | 10/1994 |
| JP | 8-119725 | 5/1996 |
| JP | 8-273537 | 10/1996 |
| JP | 8-301631 | 11/1996 |
| JP | 8-321258 | 12/1996 |
| JP | 9-12336 | 1/1997 |
| JP | 9-134676 | 5/1997 |
| JP | 10-134705 | 5/1997 |
| JP | 9-147754 | 6/1997 |
| JP | 9-245629 | 9/1997 |
| JP | 9-259754 | 10/1997 |
| JP | 9-265905 | 10/1997 |
| JP | 10-326571 | 12/1998 |
| JP | 11-135025 | 5/1999 |
| JP | 11-339668 | 12/1999 |
| JP | 2000-21303 | 1/2000 |
| WO | WO 22961 | 6/1997 |

* cited by examiner

METHOD FOR PRECISE MOLDING AND ALIGNMENT OF STRUCTURES ON A SUBSTRATE USING A STRETCHABLE MOLD

RELATED U.S. APPLICATIONS

This application is a continuation of U.S. patent application Ser. No. 10/626,285 filed Jul. 24, 2003, now U.S. Pat. No. 6,802,754; which is a continuation of U.S. patent application Ser. No. 09/972,655 filed Oct. 5, 2001, now U.S. Pat. No. 6,616,887; which is a continuation of U.S. patent application Ser. No. 09/779,207 filed Feb. 8, 2001, now U.S. Pat. No. 6,325,610; which is a division of U.S. patent application Ser. No. 09/219,803 filed Dec. 23, 1998, now U.S. Pat. No. 6,247,986.

TECHNICAL FIELD

The present invention generally relates to methods of forming and aligning structures on patterned substrates. More specifically, the present invention relates to methods of molding and aligning glass, ceramic, and/or metal structures on patterned substrates for display applications, and to displays having barrier ribs molded and aligned using a stretchable mold.

BACKGROUND

Advancements in display technology, including the development of plasma display panels (PDPs) and plasma addressed liquid crystal (PALC) displays, have led to an interest in forming electrically-insulating ceramic barrier ribs on glass substrates. The ceramic barrier ribs separate cells in which an inert gas can be excited by an electric field applied between opposing electrodes. The gas discharge emits ultraviolet (uv) radiation within the cell. In the case of PDPs, the interior of the cell is coated with a phosphor which gives off red, green, or blue visible light when excited by uv radiation. The size of the cells determines the size of the picture elements (pixels) in the display. PDPs and PALC displays can be used, for example, as display screens in high definition television (HDTV) or other digital electronic displays.

Various methods have been used to fabricate ceramic barrier ribs for PDPs. One method is repeated screen printing. In this method, a screen is aligned on the substrate and used to print a thin layer of barrier rib material. The screen is removed and the material is hardened. Because the amount of material that can be printed with this technique is insufficient to create ribs having the desired height (typically about 100 μm to 200 μm), the screen is then realigned and a second layer of barrier rib material is printed on top of the first layer. The second layer is then hardened. Layers of rib material are repeatedly printed and hardened until the desired barrier height is achieved. The multiple alignment and hardening steps required with this method results in a long processing time and poor control of the overall barrier rib profile shape.

Another method involves masking and sandblasting. In this method, a substrate having electrodes is coated with the barrier rib material which is partially fired. A mask is then applied to the barrier material using conventional lithography techniques. The mask is applied on the areas between the electrodes. The substrate is then sandblasted to remove the barrier rib material exposed by the mask. Finally, the mask is removed and the barrier ribs are fired to completion. This method requires only one alignment step and can therefore be more accurate than the multiple screen printing method. However, because the area of the finished substrate covered by barrier ribs is small, most of the barrier rib material must be removed by sandblasting. This large amount of waste increases the production cost. In addition, because the barrier rib material often includes lead-based glass frit, environmentally-friendly disposal of the removed material is an issue. Also, while the positions of the ribs after sandblasting can be quite accurate, the overall shapes of the ribs, including the height-to-width aspect ratio, can be difficult to control.

Another process utilizes conventional photolithographic techniques to pattern the barrier rib material. In this technique, the barrier rib material includes a photosensitive resist. The barrier rib material is coated onto the substrate over the electrodes, often by laminating the rib material in the form of a tape onto the substrate. A mask is applied over the barrier rib material and the material is exposed by radiation. The mask is removed and the exposed areas of the material are developed. Barrier rib material can then be removed by washing to form the rib structures. This process can give high precision and accuracy. However, as with sandblasting, much material is wasted because the entire substrate is initially coated with the barrier rib material and the ribs are patterned by material removal. Another process involves using a mold to fabricate barrier ribs. This can be done by direct molding on the substrate or by molding on a transfer sheet and then transferring the ribs to a substrate. Direct molding onto a substrate involves coating either the substrate or the mold with barrier rib material, pressing the mold against the substrate, hardening the material on the substrate, and removing the mold. For example, Japanese Laid-Open Patent Application No. 9-134676 discloses using a metal or glass mold to shape barrier ribs from a glass or ceramic powder dispersed in a binder onto a glass substrate. Japanese Laid-Open Patent Application No. 9-147754 disclosed the same process where electrodes are transferred to the substrate simultaneously with the barrier ribs using a mold. After hardening the barrier rib material and removing the mold, the barrier ribs are fired to remove the binder.

European Patent Application EP 0 836 892 A2 describes printing a mixture of a glass or ceramic powder in a binder onto a transfer sheet. The material is printed using a roll or plate intaglio to form barrier rib shapes on the transfer sheet. A substrate is then pressed against the rib material on the transfer sheet to adhere the material to the substrate. After curing the rib material on the substrate, the ribs are fired. The transfer film can be removed before firing or burned away during firing.

SUMMARY OF THE INVENTION

While direct molding offers less wasted material than sandblasting or lithography and fewer alignment steps than screen printing, it poses challenges such as releasing the mold consistently and repeatedly from the barrier rib material and fabricating a separate mold for each unique display substrate. For example, slight adjustments in barrier rib pitch dimensions are desired to account for variations in shrinkage factors of glass substrates due to, for example, different lots or different suppliers.

If the barrier ribs are initially molded onto a transfer sheet, this method has the same disadvantages as direct molding. In addition, the transfer sheet with the rib material must be aligned with the electrodes on the substrate. This printing method may be used to print a pattern on a flexible film where the pattern on the film can subsequently be used as a mold for direct molding of barrier ribs. One difficulty, however, is that when the mold and rib material are pressed against the substrate to adhere the rib material to the substrate, the mold tends to elongate. This motion of the mold make precise alignment across the substrate very difficult. The method disclosed for solving this problem is to deposit a metal layer on the back of the mold to keep the mold from being able to elongate.

The present invention provides a method for forming and aligning microstructures on patterned substrates. Preferred embodiments of the present invention permit formation and alignment of microstructures on patterned substrates with high precision and accuracy over relatively large distances.

In a first aspect, the method of the present invention is a process for forming and aligning microstructures on a patterned substrate which proceeds by first placing a mixture comprising a curable material between a patterned substrate and a patterned surface of a mold. The patterned surface of the mold has a plurality of microstructures thereon. Microstructure as used in this application refers to indentations or protrusions in the surface of the mold. The mold is stretched to align a predetermined portion of the patterned surface of the mold with a correspondingly predetermined portion of the patterned substrate. The curable material between the mold and the substrate is cured to a rigid state adhered to the substrate. The mold is then removed, leaving hardened structures of the mixture aligned with the pattern of the substrate, the hardened structures replicating the microstructures of the patterned surface of the mold.

In another aspect, the present invention is a process for forming and aligning ceramic microstructures on a patterned substrate. A slurry is provided, the slurry being a mixture of a ceramic powder and a curable fugitive binder. The slurry is placed between a patterned glass substrate and a patterned surface of a mold, the patterned surface of the mold having a plurality of microstructures thereon. The mold is stretched to align a predetermined portion of the patterned surface of the mold with a correspondingly predetermined portion of the patterned substrate. The curable binder of the slurry is cured to harden the slurry and to adhere the slurry to the substrate. Then the mold is removed to leave green state microstructures of the slurry adhered to the substrate, the green state microstructures substantially replicating the microstructures of the patterned surface of the mold. The green state microstructures may be thermally processed to form substantially dense ceramic microstructures.

In another aspect, the present invention is a substrate element for use in an electronic display having microstructured barrier ribs molded and aligned on a patterned portion of a substrate. For example, the present invention provides a high definition television screen assembly including a plasma display panel. The plasma display panel includes a back glass substrate having a plurality of independently addressable electrodes forming a pattern and a plurality of ceramic microstructured barriers molded and aligned with the electrode pattern on the back substrate according to the process of the present invention. Phosphor powder is deposited between the ceramic barriers, and a front glass substrate having a plurality of electrodes is mounted with its electrodes orthogonally facing the electrodes of the back substrate. An inert gas is disposed between the front and back substrates.

In yet another aspect, the present invention provides an apparatus for molding and aligning ceramic microstructures on a patterned substrate. The apparatus stretches a stretchable mold having a microstructure thereon into close proximity with a patterned substrate, registers and aligns the microstructure of the mold with a predetermined portion of the patterned substrate, applies a slurry comprising a ceramic powder dispersed in a curable binder between the microstructure of the mold and the substrate, stretches the mold to align the microstructure of the mold with the predetermined portion of the patterned substrate, and cures the binder of the slurry between the substrate and the mold.

DETAILED DESCRIPTION

The method of the present invention enables accurate molding of microstructures on a patterned substrate. While the method of the present invention can be used to mold and align microstructures made of various curable materials onto various patterned substrates for various applications, it is convenient to describe aspects of the method in terms of a particular application, namely molding and aligning ceramic barrier rib microstructures on an electrode-patterned substrate. Ceramic barrier rib microstructures are particularly useful in electronic displays in which pixels are addressed or illuminated via plasma generation between opposing substrates, such as PDPs and PALC displays. References to ceramic microstructure applications in the description of the method of the present invention that follows serve to illustrate aspects of the present invention and should not be read to limit the scope of the present invention or of the claims recited.

As used herein, the term ceramic refers generally to ceramic materials or glass materials. Thus, in the slurry used in one aspect of the method of the present invention, the included ceramic powder can be glass or ceramic particles, or mixtures thereof. Also, the terms fused microstructures, fired microstructures, and ceramic microstructures refer to microstructures formed using the method of the present invention which have been fired at an elevated temperature to fuse or sinter the ceramic particles included therein.

In an illustrative aspect, the method of the present invention includes using a slurry which contains a ceramic powder, a curable organic binder, and a diluent. The slurry is described in copending and cofiled U.S. Pat. No. 6,352,763, which is incorporated herein by reference. When the binder is in its initial uncured state, the slurry can be shaped and aligned on a substrate using a mold. After curing the binder, the slurry is in at least a semi-rigid state which can retain the shape in which it was molded. This cured, rigid state is referred to as the green state, just as shaped ceramic materials are called "green" before they are sintered. When the slurry is cured, the mold can be removed from the green state microstructures. The green state material can subsequently be debinded and/or fired. Debinding, or burn out, occurs when the green state material is heated to a temperature at which the binder can diffuse to a surface of the material and volatilize. Debinding is usually followed by increasing the temperature to a predetermined firing temperature to sinter or fuse the particles of the ceramic powder. After firing, the material can be referred to as fired material. Fired microstructures are referred to herein as ceramic microstructures.

Figure 1:
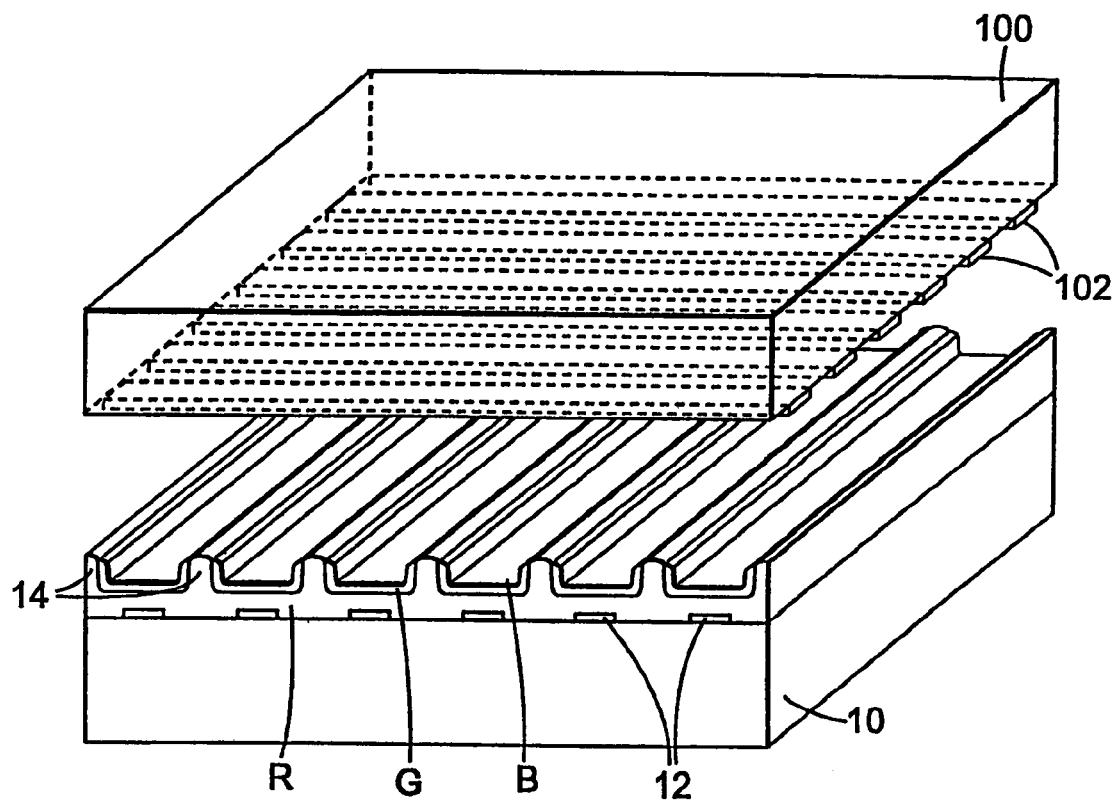
FIG. 1 is a schematic representation of a plasma display panel assembly.

FIG. 1 shows the substrate elements of a plasma display panel. The back substrate element, oriented away from the viewer, has a glass substrate 10 with independently addressable parallel electrodes 12. Ceramic barrier ribs 14 are positioned between electrodes and separate areas in which red (R), green (G), and blue (B) phosphors are deposited. The front substrate element includes a glass substrate 100 and a set of independently addressable parallel electrodes 102. The front electrodes 102, also called sustain electrodes, are oriented perpendicular to the back electrodes 12, also referred to as address electrodes. In a completed display, the area between the front and back substrate elements is filled with an inert gas. To light up a pixel, an electric field is applied between crossed sustain and address electrodes with enough strength to excite the inert gas atoms therebetween. The excited inert gas atoms emit uv radiation which causes the phosphor to emit red, green, or blue visible light.

Back substrate 10 is preferably a transparent glass substrate. Typically, substrate 10 is made of soda lime glass which can optionally be substantially free of alkali metals. The temperatures reached during processing can cause migration of the electrode material in the presence of alkali metal in the substrate. This migration can result in conductive pathways between electrodes, thereby shorting out adjacent electrodes or causing undesirable electrical interference between electrodes known as "crosstalk." The substrate should be able to withstand the temperatures required for sintering, or firing, the ceramic barrier rib material. Firing temperatures may vary widely from about 400° C. to 1600° C., but typical firing temperatures for PDP manufacture onto soda lime glass substrates range from about 400° C. to about 600° C., depending on the softening temperature of the ceramic powder in the slurry. Front substrate 100 is a transparent glass substrate which preferably has the same or about the same coefficient of thermal expansion as that of the back substrate.

Electrodes 12 are strips of conductive material. Typically, the electrodes are Cu, Al, or a silver-containing conductive frit. The electrodes can also be a transparent conductive oxide material, such as indium tin oxide, especially in cases where it is desirable to have a transparent display panel. The electrodes are patterned on back substrate 10, usually forming parallel strips spaced about 120 $\mu$m to 360 $\mu$m apart, having widths of about 50 $\mu$m to 75 $\mu$m, thicknesses of about 2 $\mu$m to 15 $\mu$m, and lengths that span the entire active display area which can range from a few centimeters to several tens of centimeters.

Barrier ribs 14 contain ceramic particles which have been fused or sintered by firing to form rigid, substantially dense, dielectric barrier ribs. The ceramic material of the barrier ribs is preferably alkali-metal free. The presence of alkali metals in the glass frit or ceramic powder can lead to undesirable migration of conductive material from the electrodes on the substrate. The ceramic material forming the barrier ribs has a softening temperature lower than the softening temperature of the substrate. The softening temperature is the lowest temperature at which a glass or ceramic material can be fused to a relatively dense structure having little or no surface-connect porosity. Preferably, the softening temperature of the ceramic material of the slurry is less than about 600° C., more preferably less than about 560° C., and most preferably less than about 500° C. Preferably, the material of the barrier ribs has a coefficient of thermal expansion that is within 10% of the coefficient of expansion of the glass substrates. Close matching of the coefficients of expansion of the barrier ribs and the substrates reduces the chances of damaging the ribs during processing. Also, differences in coefficients of thermal expansion can cause significant substrate warpage or breakage. Barrier ribs in PDPs typically have heights of about 120 $\mu$m to 140 $\mu$m and widths of about 20 $\mu$m to 75 $\mu$m. The pitch (number per unit length) of the barrier ribs preferably matches the pitch of the electrodes.

It is important that PDP barrier ribs be positioned on the substrate between electrode positions. In other words, the pitch, or the periodicity, of the barrier ribs should closely match the pitch of the electrodes across the entire width of the display area. Misalignment adversely affects the functionality of the display. The spacing between the peaks of adjacent barrier ribs is preferably held to a tolerance of tens of parts per million (ppm) of the electrode pitch over the entire width of the display. Because the larger displays can have widths of 100 cm or more with an electrode pitch of about 200 $\mu$m, the barrier ribs are preferably patterned to hold their alignment with the electrodes to within 10 $\mu$m to 40 $\mu$m over nearly 100 cm.

While it is the phosphors and not the barrier ribs that give off visible light in an active display, the optical properties of the ribs can enhance or detract from the display characteristics. Preferably, the sides of the barrier ribs are white and highly reflective so that light which does not directly exit an activated cell is not lost to absorption in significant amounts.

The barrier ribs also preferably have a low porosity. Highly porous ribs have large surface areas that can trap molecules which may contaminate the display and decrease the life of the display. When the display substrates are put together and sealed, the air between the substrate elements is replaced with an inert gas mixture for plasma generation. Molecules adsorbed in porous ribs can remain inside the display and desorb over time, leading to contamination and reducing the lifetime of the display.

After forming and firing the barrier rib materials, the phosphor materials are deposited between the barrier ribs, typically by screen printing. For linear barrier ribs, one type of phosphor material is deposited along the entire length of each channel defined by an adjacent pair of barrier ribs. The type of phosphor is alternated for adjacent channels to form a repeating pattern such as red, green, blue, red, green, blue, and so on.

The process of the present invention permits forming and aligning microstructures on a patterned substrate. The process of the present invention involves providing a mold, providing a material which can be cured or hardened to form microstructures, placing the material between the mold and a patterned substrate, aligning the mold with the pattern of the substrate, hardening the material between the mold and the substrate, and removing the mold. The mold has two opposing major surfaces, a generally flat surface and a patterned, or structured, surface. The patterned surface of the mold has a plurality of microstructures which represent the negative image of the microstructures to be formed and aligned on the patterned substrate. As described in further detail below, the pattern of the mold is designed such that matching between the pattern of the mold and the pattern of the substrate can be achieved by stretching the mold in at least one direction. By so stretching the mold for alignment, the mold can be corrected for mold or substrate variations due to variations in processing conditions, variations in the environment (such as temperature and humidity changes), and aging which can cause slight shifting, elongation, or shrinking of the pattern of the mold. If the position of the mold shifts in any manner during processing, the microstructures being formed on the substrate can become damaged and/or misaligned.

In many applications, the microstructures to be formed on the substrate are to be aligned with a patterned portion of the substrate in such a manner that each microstructure is positioned in a precise location relative to the pattern of the substrate. For example, on PDP substrates having a plurality of parallel electrodes, it is desirable to form uniformly-sized ceramic barriers positioned between each electrode. PDP substrates can have 1000 to 5000 or more parallel address electrodes that must each be separated by barrier ribs. Each of these barrier ribs must be placed with a certain precision, and this precision must be held across the width of the substrate. The process of the present invention allows for accurate and precise alignment of the mold pattern with the substrate pattern to form microstructures on the substrate with accurate and precise alignment which is consistently held across the substrate.

The material for forming the microstructures on the patterned substrate can be placed between the mold and the substrate in a variety of ways. The material can be placed directly in the pattern of the mold followed by placing the mold and material on the substrate, the material can be placed on the substrate followed by pressing the mold against the material on the substrate, or the material can be introduced into a gap between the mold and the substrate as the mold and substrate are brought together by mechanical or other means. The method used for placing the material between the mold and the substrate depends on, among other things, the aspect ratio of the structures to be formed on the substrate, the viscosity of the microstructure-forming material, and the rigidity of the mold. Structures having heights that are large compared to their widths (high aspect ratio structures) require molds having relatively deep indentations. In these cases, depending on the viscosity of the material, it can be difficult to completely fill the indentations of the mold unless the material is injected into the indentations of the mold with some force. In addition, care should be taken to fill the indentations of the mold while minimizing the introduction of bubbles or air pockets in the material.

Figure 2:
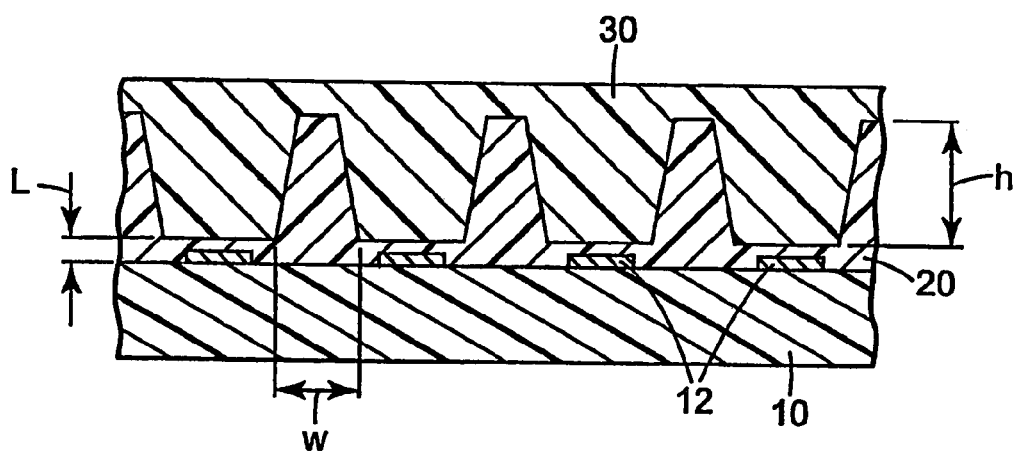
FIG. 2 is a cross-sectional schematic of a slurry disposed between a mold and a patterned substrate.

While placing the material between the mold and the substrate, pressure can be applied between the substrate and the mold to set a land thickness, L, as in FIG. 2. The land is the material between the substrate and the base of the microstructures formed on the substrate. The land thickness can vary depending on the application. If zero land thickness is desired, it may be preferable to fill the mold with the material and then remove any excess material from the mold using a blade or squeegee before contacting the substrate. For other applications, it may be desirable to have a non-zero land thickness. In the case of PDPs, the material forming the microstructured barrier ribs is a dielectric, and the land thickness determines the thickness of dielectric material positioned on substrate electrodes 12. Thus, for PDPs, the land thickness can be important for determining what voltage must be applied between electrodes to generate a plasma and to activate a picture element.

The next step is to align the pattern of the mold with the pattern of the substrate. Under ideal conditions, the pattern of the mold as fabricated and the pattern of the substrate as fabricated would perfectly match. However, in practice this is rarely, if ever, the case. Processing steps can cause the dimensions of the substrate and the mold to change. While these dimensional changes might be slight, they can adversely affect the precise placement of microstructures aligned with the substrate pattern using a mold. For example, a PDP substrate having a width of 100 cm and an electrode pitch of 200 $\mu$m requires that each of 5000 barrier ribs be placed precisely between adjacent electrodes. A difference between the pitch of the electrodes and the pitch of the mold of only 0.1 $\mu$m (or 0.05%) means that the pattern of the barrier ribs and the electrode pattern on the substrate will be misaligned, and be 180° out of phase in at least two regions across the substrate. This is fatal for display device functionality. For such a PDP substrate, the pitch of the mold and the pitch of the electrodes should have a mismatch of 0.01% or less.

Figure 3:
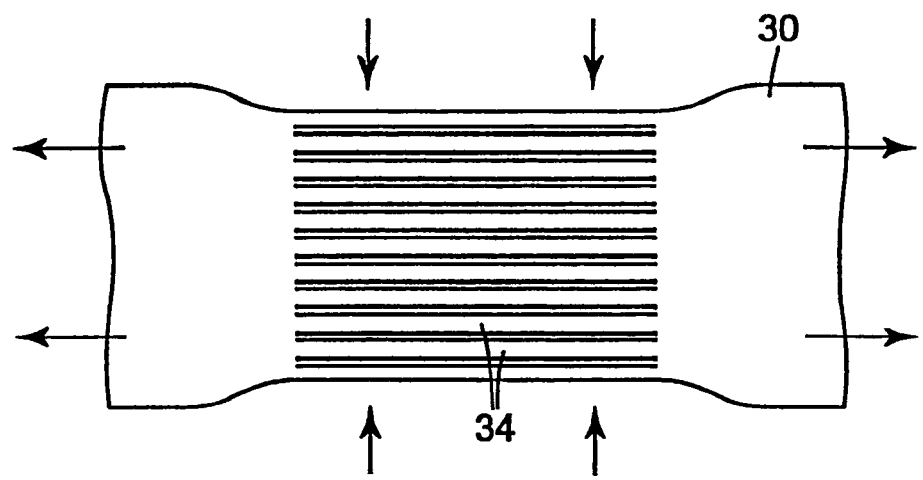
FIG. 3 is a schematic representation of a method of stretching a structured mold according to the present invention.

The process of the present invention employs a mold capable of being stretched to facilitate precise alignment of the pattern of the mold with the pattern of the substrate. First, the mold is rough aligned by placing the pattern of the mold in the same orientation as the pattern of the substrate. The mold and substrate are checked for registry of their respective patterns. The mold is stretched in one or more directions parallel to the plane of the substrate until the desired registry is achieved. In the case of substrates having a pattern of parallel lines, such as electrodes on a PDP substrate, the mold is preferably stretched in one direction, either parallel to the substrate pattern or perpendicular to the substrate pattern, depending on whether the pitch of the mold is greater than or less than the pitch of the substrate pattern. FIG. 3 shows the case where mold 30 is stretched in a direction parallel to the parallel line pattern of the substrate 34. In this case, the pitch of the pattern of the mold is reduced during stretching to conform it to the pitch of the pattern of the substrate. To expand the pitch of the mold, the mold is stretched in the perpendicular direction.

Stretching can take place using a variety of known techniques. For example, the edges of the mold can be attached to adjustable rollers which can increase or decrease the tension on the mold until alignment is achieved. In cases where it is desirable to stretch the mold in more than one direction simultaneously, the mold can be heated to thermally expand the mold until alignment is achieved.

After alignment of the pattern of the mold with the pattern of the substrate, the material between the mold and the substrate is cured to form microstructures adhered to the surface of the substrate. Curing of the material can take place in a variety of ways depending on the binder resin used. For example, the material can be cured by curing using visible light, ultraviolet light, e-beam radiation, or other forms of radiation, by heat curing, or by cooling to solidification from a melted state. When radiation curing, radiation can be propagated through the substrate, through the mold, or through the substrate and the mold. Preferably, the cure system chosen optimizes adhesion of the cured material to the substrate. As such, in cases where material is used which tends to shrink during hardening and radiation curing is used, the material is preferably cured by irradiating through the substrate. If the material is cured only through the mold, the material might pull away from the substrate via shrinkage during curing, thereby adversely affecting adhesion to the substrate. In the present application, curable refers to a material that may be cured as described above.

Figure 4:
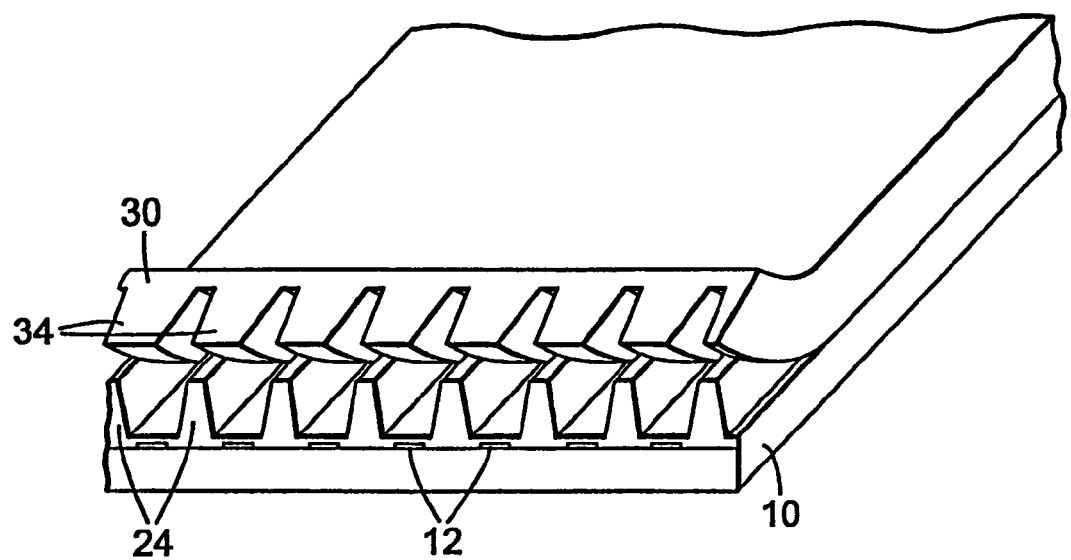
FIG. 4 is a schematic representation of a method of removing a mold from green state microstructures.

After curing the material to form microstructures adhered to the substrate surface and aligned to the pattern of the substrate, the mold can be removed. Providing a stretchable and flexible mold can aid in mold removal because the mold can be peeled back so that the demolding force can be focused on a smaller surface area. As shown in FIG. 4, when linear rib-like microstructures are molded such as barrier ribs 24, mold 30 is preferably removed by peeling back along a direction parallel with ribs 24 and mold pattern 34. This minimizes the pressure applied perpendicular to the ribs during mold removal, thereby reducing the possibility of damaging the ribs. Preferably, a mold release is included either as a coating on the patterned surface of the mold or in the material that is hardened to form the microstructure itself. The advantages of including a mold release composition in the hardenable material is described in more detail below with respect to a moldable slurry used to form ceramic barrier ribs on a PDP substrate. A mold release material becomes more important as higher aspect ratio structures are formed. Higher aspect ratio structures make demolding more difficult, and can lead to damage to the microstructures. As discussed above, curing the material from the substrate side not only helps improve adhesion of the hardened microstructures to the substrate, but can allow the structures to shrink toward the substrate during curing, thereby pulling away from the mold to permit easier demolding.

Figure 5:
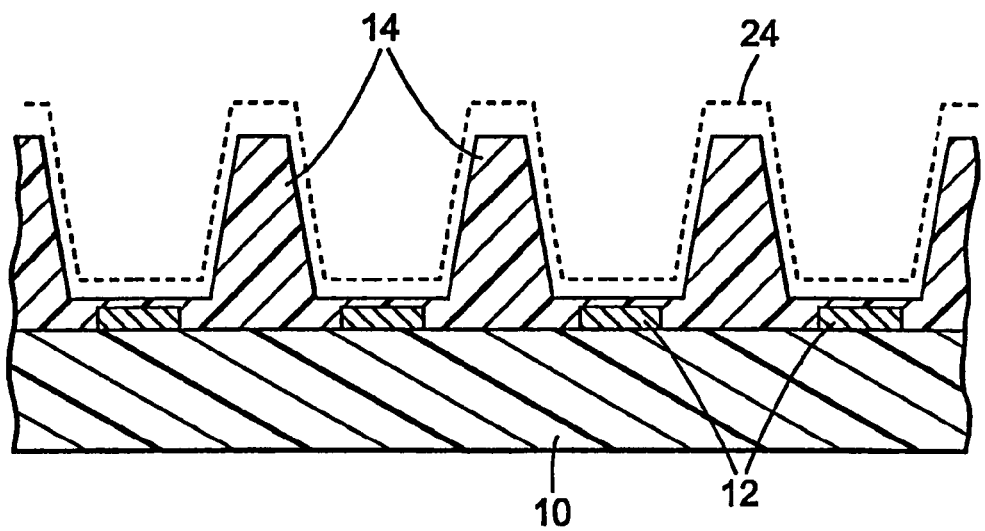
FIG. 5 is a schematic representation of ceramic microstructures molded and aligned on a patterned substrate.

After the mold is removed, what remains is the patterned substrate having a plurality of hardened microstructures adhered thereon and aligned with the pattern of the substrate. Depending on the application, this can be the finished product. In other applications such as substrates that will have a plurality of ceramic microstructures, the hardened material contains a binder which is preferably removed by debinding at elevated temperatures. After debinding, or burning out of the binder, firing of the green state ceramic microstructures is performed to fuse the glass particles or sinter the ceramic particles in the material of the microstructures. This increases the strength and rigidity of the microstructures. Shrinkage also occurs during firing as the microstructure densifies. FIG. 5 shows ceramic microstructures 14 after firing on a substrate 10 having patterned electrodes 12. Firing densifies microstructures 14 so that their profile shrinks somewhat from their green state profile 24 as indicated. As shown, fired microstructures 14 maintain their positions and their pitch according to the substrate pattern.

For PDP display applications, phosphor material is applied to fired barrier ribs, and the substrate can then be installed into a display assembly. This involves aligning a front substrate having sustain electrodes with the back substrate having address electrodes, barrier ribs, and phosphor such that the sustain electrodes are perpendicular with the address electrodes. The areas through which the opposing electrodes cross define the pixels of the display. The space between the substrates is then evacuated and filled with an inert gas as the substrates are bonded together and sealed at their edges.

It should be noted that the process of the present invention can lend itself well to automation to take advantage of the efficiencies offered by continuous processing. For example, the patterned substrate can be conveyed by a belt or other mechanisms to an area where the mold can be brought into close proximity with the substrate by, for example, a rotating drum. As the mold is brought close to the substrate, an extrusion die or other means can be used to apply the curable slurry between the patterned surface of the mold and the patterned surface of the substrate. The conveyer means for the substrate and the conveyer means for the mold are positioned such that rough positioning of the pattern of the mold with the pattern of the substrate occurs as the two are brought together and as the material is placed therebetween. After placing the hardenable material between the substrate and the mold, alignment between the pattern of the mold and the pattern of the substrate can be automatically checked, for example by optical detectors. The optical detectors can look for alignment fiducials or check for a moire interference pattern due to misalignment of the pattern of the mold and the pattern of the substrate. The mold can then be stretched by, for example, gripping a pair of opposing edges of the mold and pulling until the optical detectors confirm alignment. At this point, the material between the mold and substrate can be cured by irradiating the material through the substrate, through the mold, or both. After a predetermined curing time, the substrate and mold can be advanced as the rotating drum peels the mold away from the cured microstructures formed and aligned on the patterned substrate.

Figure 6:
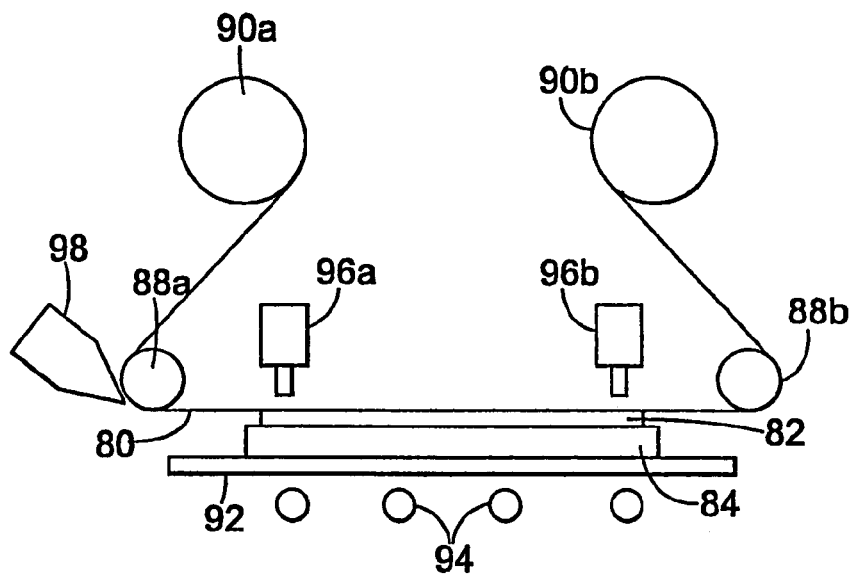
FIG. 6 is a schematic representation of an apparatus for molding and aligning micro structures.

FIG. 6 shows an apparatus for molding, aligning, and curing microstructures on a patterned substrate using a microstructured mold. Substrate 84 resides on mechanical stage 92 which preferably has the ability of x-motion (motion from left to right in the figure), y-motion (motion in and out of the page of the figure), and θ-motion (rotational motion in the x-y plane). Such motion allows substrate 84 to be moved into position for alignment and curing, to be rough aligned with the mold, and to be moved out of position for removal of the mold after curing. Rolls 90a and 90b are wind up and unwind rolls, respectively, for moving flexible, stretchable mold 80 in line with substrate 84. To introduce the curable material between substrate 84 and mold 80, substrate 84 and mold 80 are moved in concert as the curable material is injected by injection means 98 into a gap between mold 80 and substrate 84 near roll 88a. Substrate 84 and mold 80 are moved in unison as the material is applied therebetween until the desired amount of material is applied between the pattern of the substrate and the pattern of the mold. FIG. 6 shows the substrate 84 and mold 80, having curable material 82 disposed between, moved into an area where optical detectors 96a and 96b check for alignment. Depending on the pattern of the microstructures, two or more detectors may be required. Rollers 88a and 88b can then be oppositely rotated to stretch the mold until the pattern of the mold and the pattern of the substrate are aligned with the desired precision. At this point, radiation source 94 is used to irradiate curable material 82 through substrate 84. After material 82 is cured, the substrate and mold are moved in unison as roller 88b acts to peel the mold away from the cured microstructures which have been molded in alignment with the pattern of the substrate.

An alternative method of molding and aligning microstructures on a patterned substrate according to the present invention involves a static stretching method. For example, a patterned substrate can be provided which has protrusions or indentions located outside of the pattern of the substrate and on opposing ends of the substrate. The stretchable mold also has protrusions or indentions located outside of the microstructured pattern of the mold which align and interlock with those provided on the substrate when the mold is slightly stretched. These added interlocking features on the substrate and the mold hold the pattern of the mold in alignment with the pattern of the substrate without the need for other machinery.

The method of the present invention preferably uses a mold capable of being stretched in at least one direction to align the pattern of the mold to a predetermined portion of the patterned substrate. The mold is preferably a flexible polymer sheet having a smooth surface and an opposing microstructured surface. The mold can be made by compression molding of a thermoplastic material using a master tool which has a microstructured pattern. The mold can also be made of a curable material which is cast and cured onto a thin, flexible polymer film.

The microstructured mold of the present invention is preferably formed according to a process similar to the processes disclosed in U.S. Pat. No. 5,175,030 (Lu et al.) and U.S. Pat. No. 5,183,597 (Lu). The formation process preferably includes the following steps: (a) preparing an oligomeric resin composition; (b) depositing the oligomeric resin composition onto a master negative microstructured tooling surface in an amount barely sufficient to fill the cavities of the master; (c) filling the cavities by moving a bead of the composition between a preformed substrate and the master, at least one of which is flexible; and (d) curing the oligomeric composition.

The oligomeric resin composition of step (a) preferably is a one-part, solvent-free, radiation-polymerizable, crosslinkable, organic oligomeric composition. The oligomeric composition is preferably one which is curable to form a flexible and dimensionally-stable cured polymer. The curing of the oligomeric resin should occur with low shrinkage. One preferred suitable oligomeric composition is an aliphatic urethane acrylate such as one sold by the Henkel Corporation, Ambler, Pa., under the trade designation Photomer 6010, although similar compounds are available from other suppliers.

Acrylate functional monomers and oligomers are preferred because they polymerize more quickly under normal curing conditions. Further, a large variety of acrylate esters are commercially available. However, methacrylate, acrylamide and methacrylamide functional ingredients can also be used without restriction. Herein, where acrylate is used, methacrylate is understood as being acceptable.

Polymerization can be accomplished by usual means, such as heating in the presence of free radical initiators, irradiation with ultraviolet or visible light in the presence of suitable photoinitiators, and by irradiation with electron beam. For reasons of convenience, low capital investment, and production speed, the preferred method of polymerization is by irradiation with ultraviolet or visible light in the presence of photoinitiator at a concentration of about 0.1 percent to about 1.0 percent by weight of the oligomeric composition. Higher concentrations can be used but are not normally needed to obtain the desired cured resin properties.

The viscosity of the oligomeric composition deposited in step (b) is preferably between 500 and 5000 centipoise (500 and $5000 \times 10^{-3}$ Pascal-seconds). If the oligomeric composition has a viscosity above this range, air bubbles might become entrapped in the composition. Additionally, the composition might not completely fill the cavities in the master tooling. For this reason, the resin can be heated to lower the viscosity into the desired range. When an oligomeric composition with a viscosity below that range is used, the oligomeric composition usually experiences shrinkage upon curing that prevents the oligomeric composition from accurately replicating the master.

Almost any material can be used for the base (substrate) of the patterned mold, as long as that material is substantially optically clear to the curing radiation and has enough strength to allow handling during casting of the microstructure. In addition, the material used for the base should be chosen so that it has sufficient thermal stability during processing and use of the mold. Polyethylene terephthalate or polycarbonate films are preferable for use as a substrate in step (c) because the materials are economical, optically transparent to curing radiation, and have good tensile strength. Substrate thicknesses of 0.025 millimeters to 0.5 millimeters are preferred and thicknesses of 0.075 millimeters to 0.175 millimeters are especially preferred. Other useful substrates for the microstructured mold include cellulose acetate butyrate, cellulose acetate propionate, polyether sulfone, polymethyl methacrylate, polyurethane, polyester, and polyvinyl chloride. The surface of the substrate may also be treated to promote adhesion to the oligomeric composition.

Examples of such polyethylene terephthalate based materials include: photograde polyethylene terephthalate; and polyethylene terephthalate (PET) having a surface that is formed according to the method described in U.S. Pat. No. 4,340,276.

A preferred master for use with the above-described method is a metallic tool. If the temperature of the curing and optionally simultaneous heat treating step is not too great, the master can also be constructed from a thermoplastic material, such as a laminate of polyethylene and polypropylene.

After the oligomeric resin fills the cavities between the substrate and the master, the oligomeric resin is cured, removed from the master, and may or may not be heat treated to relieve any residual stresses. When curing of the mold resin material results in shrinkage of greater than about 5% (e.g., when a resin having a substantial portion of monomer or low molecular weight oligomers is used), it has been observed that the resulting microstructures can be distorted. The distortion that occurs is typically evidenced by a concave microstructure sidewalls and/or slanted tops on features of the microstructures. Although these low viscosity resins perform well for replication of small, low aspect ratio microstructures, they are not preferred for relatively high aspect ratio microstructures for which the sidewall angles and the top flatness must be maintained. In forming ceramic barrier ribs for PDP applications, relatively high aspect ratio ribs are desired, and the maintenance of relatively straight sidewalls and tops on the barrier ribs can be important.

As indicated above, the mold can alternatively be replicated by compression molding a suitable thermoplastic against the master metal tool.

When using the method of the present invention to mold and align ceramic microstructures on patterned display substrates, the molding material is preferably a slurry containing a mixture of at least three components. The first component is a ceramic powder. The ceramic material of the slurry will ultimately be fused or sintered by firing to form microstructures having desired physical properties adhered to the patterned substrate. The second component is a fugitive binder which is capable of being shaped and subsequently hardened by curing or cooling. The binder allows the slurry to be shaped into semi-rigid green state microstructures which are adhered to the substrate so that the stretchable mold used to form and align the microstructures can be removed in preparation for debinding and firing. The third component is a diluent which can promote release from the mold after alignment and hardening of the binder material, and can promote fast and complete burn out of the binder during debinding before firing the ceramic material of the microstructures. The diluent preferably remains a liquid after the binder is hardened so that the diluent phase-separates from the binder material during binder hardening.

The ceramic powder is chosen based on the end application of the microstructures and the properties of the substrate to which the microstructures will be adhered. One consideration is the coefficient of thermal expansion (CTE) of the substrate material. Preferably, the CTE of the ceramic material of the slurry differs from the CTE of the substrate material by no more than about 10%. When the substrate material has a CTE which is much less than or much greater than the CTE of the ceramic material of the microstructures, the microstructures can warp, crack, fracture, shift position, or completely break off from the substrate during processing or use. Further, the substrate can warp due to a high difference in CTE between the substrate and the ceramic microstructures.

The substrate should be able to withstand the temperatures necessary to process the ceramic material of the slurry. Glass or ceramic materials suitable for use in the slurry preferably have softening temperatures below about 600° C., and usually between about 400° C. and 600° C. Thus, a preferred choice for the substrate is a glass, ceramic, metal, or other rigid material which has a softening temperature which is higher than that of the ceramic material of the slurry. Preferably, the substrate has a softening temperature which is higher than the temperature at which the microstructures are to be fired. In addition, glass or ceramic materials suitable for use in the slurry of the present invention preferably have coefficients of thermal expansion of about $5 \times 10^{-6}/°$ C. to $13 \times 10^{-6}/°$ C. Thus, the substrate preferably has a CTE approximately in this range as well.

Choosing a ceramic powder having a low softening temperature allows the use of a substrate also having a relatively low softening temperature. In the case of glass substrates, soda lime float glass having low softening temperatures is typically less expensive than glass having higher softening temperatures. Thus, the use of a low softening temperature ceramic powder can allow the use of a less expensive glass substrate. In addition, low softening temperature ceramic materials in the slurry of the present invention can make high precision microstructures easier to obtain. For example, when fabricating barrier ribs on a PDP glass substrate, the precision and accuracy in the alignment and placement of the barrier ribs with respect to the electrodes on the substrate should be maintained throughout processing. The ability to fire green state barrier ribs at lower temperatures minimizes the thermal expansion and the amount of stress relief required during heating, thus avoiding undue substrate distortion, barrier rib warping, and barrier rib delamination.

Lower softening temperature ceramic materials can be obtained by incorporating certain amounts of alkali metals, lead, or bismuth into the material. However, for PDP barrier ribs, the presence of alkali metals in the microstructured barriers can cause material from the electrodes to migrate across the substrate during elevated temperature processing. The diffusion of electrode material can cause interference, or "crosstalk", as well as shorts between adjacent electrodes, degrading device performance. Thus, for PDP applications, the ceramic powder of the slurry is preferably substantially free of alkali metal. In addition, the incorporation of lead or bismuth in the ceramic material of the slurry can make environmentally-friendly disposal of the material problematic. When the incorporation of lead or bismuth is not desirable, low softening temperature ceramic material can be obtained using phosphate or $B_2O_3$-containing compositions. One such composition includes ZnO and $B_2O_3$. Another such composition includes BaO and $B_2O_3$. Another such composition includes ZnO, BaO, and $B_2O_3$. Another such composition includes $La_2O_3$ and $B_2O_3$. Another such composition includes $Al_2O_3$, ZnO, and $P_2O_5$.

Other fully soluble, insoluble, or partially soluble components can be incorporated into the ceramic material of the slurry to attain or modify various properties. For example, $Al_2O_3$ or $La_2O_3$ can be added to increase chemical durability of the composition and decrease corrosion. MgO can be added to increase the glass transition temperature or to increase the CTE of the composition. $TiO_2$ can be added to give the ceramic material a higher degree of optical opacity, whiteness, and reflectivity. Other components or metal oxides can be added to modify and tailor other properties of the ceramic material such as the CTE, softening temperature, optical properties, physical properties such as brittleness, and so on.

Other means of preparing a composition which can be fired at relatively low temperatures include coating core particles in the composition with a layer of low temperature fusing material. Examples of suitable core particles include $ZrO_2$, $Al_2O_3$, $ZrO_2$—$SiO_2$, and $TiO_2$. Examples of suitable low fusing temperature coating materials include $B_2O_3$, $P_2O_5$, and glasses based on one or more of $B_2O_3$, $P_2O_5$, and $SiO_2$. These coatings can be applied by various methods. A preferred method is a sol-gel process in which the core particles are dispersed in a wet chemical precursor of the coating material. The mixture is then dried and comminuted (if necessary) to separate the coated particles. These particles can be dispersed in the glass or ceramic powder of the slurry or can be used by themselves for the glass powder of the slurry.

The ceramic powder in the slurry which can be used in the method of the present invention is preferably provided in the form of particles which are dispersed throughout the slurry. The preferred size of the particles depends on the size of the microstructures to be formed and aligned on the patterned substrate. Preferably, the average size, or diameter, of the particles in the ceramic powder of the slurry is no larger than about 10% to 15% the size of the smallest characteristic dimension of interest of the microstructures to be formed and aligned. For example, PDP barrier ribs can have widths of about 20 μm, and their widths are the smallest feature dimension of interest. For PDP barrier ribs of this size, the average particle size in the ceramic powder is preferably no larger than about 2 or 3 μm. By using particles of this size or smaller, it is more likely that the microstructures will be replicated with the desired fidelity and that the surfaces of the ceramic microstructures will be relatively smooth. As the average particle size approaches the size of the microstructures, the slurry containing the particles may no longer conform to the microstructured profile. In addition, the maximum surface roughness can vary based in part on the ceramic particle size. Thus, it is easier to form smoother structures using smaller particles.

The fugitive binder of the slurry is an organic binder chosen based on factors such as its ability to bind to the ceramic powder of the slurry, ability of being cured or otherwise hardened to retain a molded microstructure, ability of adhering to the patterned substrate, and ability to volatilize (or burn out) at temperatures at least somewhat lower than those used for firing the green state microstructures. The binder helps bind together the particles of the ceramic powder when the binder is cured or hardened so that the stretchable mold can be removed to leave rigid green state microstructures adhered to and aligned with the patterned substrate. The binder is referred to as a "fugitive binder" because the binder material can be burned out of the microstructures at elevated temperatures prior to fusing or sintering the ceramic particles in the microstructures. Preferably, firing completely burns out the fugitive binder so that the microstructures left on the patterned surface of the substrate are fused glass or ceramic microstructures which are substantially free of carbon residue. In applications where the microstructures used are dielectric barriers, such as in PDPs, the binder is preferably a material capable of debinding at a temperature at least somewhat below the temperature desired for firing without leaving behind a significant amount of carbon which can degrade the dielectric properties of the microstructured barriers. For example, binder materials containing a significant proportion of aromatic hydrocarbons, such as phenolic resin materials, can leave graphitic carbon particles during debinding which can require significantly higher temperatures to completely remove.

The binder is preferably an organic material which is radiation or heat curable. Preferred classes of materials include acrylates and epoxies. Alternatively, the binder can be a thermoplastic material which is heated to a liquid state to conform to the mold and then cooled to a hardened state to form microstructures adhered to the substrate. When precise placement and alignment of the microstructures on the substrate is desired, it is preferable that the binder is radiation curable so that the binder can be hardened under isothermal conditions. Under isothermal conditions (no change in temperature), the stretchable mold, and therefore the slurry in the mold, can be held in a fixed position relative to the pattern of the substrate during hardening of the binder material. This reduces the risk of shifting or expansion of the mold or the substrate, especially due to differential thermal expansion characteristics of the mold and the substrate, so that precise placement and alignment of the mold can be maintained as the slurry is hardened.

When using a fugitive binder which is radiation curable, it is preferable to use a cure initiator that is activated by radiation to which the substrate is substantially transparent so that the slurry can be cured by exposure through the substrate. For example, when the substrate is glass, the fugitive binder is preferably visible light curable. By curing the binder through the substrate, the slurry material adheres to the substrate first, and any shrinkage of the binder material during curing will tend to occur away from the mold and toward the surface of the substrate. This helps the microstructures demold and helps maintain the location and accuracy of the microstructure placement on the pattern of the substrate.

In addition, the selection of a cure initiator can depend on what materials are used for the ceramic powder in the slurry used in the present invention. For example, in applications where it is desirable to form ceramic microstructures which are opaque and highly diffusely reflective, it can be advantageous to include a certain amount of titania ($TiO_2$) in the ceramic powder of the slurry. While titania can be useful for increasing the reflectivity of the microstructures, it can also make curing with visible light difficult because visible light reflection by the titania in the slurry can prevent sufficient absorption of the light by the cure initiator to effectively cure the binder. However, by selecting a cure initiator which is activated by radiation which can simultaneously propagate through the substrate and the titania particles, effective curing of the binder can take place. One example of such a cure initiator is bis(2,4,6-trimethylbenzoyl)-phenylphosphineoxide, a photoinitiator commercially available from Ciba Specialty Chemicals, Hawthrone, N.Y., under the trade designation Irgacure 819. Another example is a ternary photoinitiator system prepared such as those described in U.S. Pat. No. 5,545,670 such as a mixture of ethyl dimethylaminobenzoate, camphoroquinone, and diphenyl iodonium hexafluorophosphate. Both of these examples are active in the blue region of the visible spectrum near the edge of the ultraviolet in a relatively narrow region where the radiation can penetrate both a glass substrate and titania particles in the slurry. Other cure systems may be selected for use in the process of the present invention based on the binder, the materials of the ceramic powder in the slurry, and the material of the mold or the substrate through which curing is to take place.

The diluent of the slurry used in the method of the present invention is a material selected based on factors such as its ability to enhance mold release properties of the slurry subsequent to curing the fugitive binder and to enhance debinding properties of green state structures made using the slurry. The diluent is preferably a material that is soluble in the binder prior to curing and which remains liquid after curing the fugitive binder. This provides two advantages. First, by remaining a liquid when the binder is hardened, the diluent reduces the risk of the cured binder material adhering to the mold. Second, by remaining a liquid when the binder is hardened, the diluent phase separates from the binder material, thereby forming an interpenetrating network of small pockets, or droplets, of diluent dispersed throughout the cured binder matrix. The advantages of phase separation of the diluent will become clear in the discussion that follows.

For many applications, such as PDP barrier ribs, it is desirable for debinding of the green state microstructures to be substantially complete before firing. Additionally, debinding is often the longest and highest temperature step in thermal processing. Thus, it is desirable for the slurry to be capable of debinding relatively quickly and completely and at a relatively low temperature. The preference for low temperatures is discussed in detail below.

While not wishing to be bound by any theory, debinding can be thought of as being kinetically and thermodynamically limited by two temperature-dependent processes, namely diffusion and volatilization. Volatilization is the process by which decomposed binder molecules evaporate from a surface of the green state structures and thus leave a porous network for resin egress to proceed in a less obstructed manner. In a single phase resin binder, internally-trapped gaseous degradation products can blister and/or rupture the structure. This is more prevalent in binder systems that leave a high level of carbonaceous degradation products at the surface which can form an impervious skin layer to stop the egress of binder degradation gases. In cases where single phase binders are successful, the cross sectional area is relatively small and the binder degradation heating rate is inherently long to prevent a skin layer from forming.

The rate at which volatilization occurs depends on temperature, an activation energy for volatilization, and a frequency, or sampling rate. Because volatilization occurs primarily at or near surfaces, the sampling rate is proportional to the total surface area of the structures. Diffusion is the process by which binder molecules migrate to surfaces from the bulk of the structures. Due to volatilization of binder material from the surfaces, there is a concentration gradient which tends to drive binder material toward the surfaces where there is a lower concentration. The rate of diffusion depends on temperature, an activation energy for diffusion, and a frequency.

Because volatilization is limited by the surface area, if the surface area is small relative to the bulk of the microstructures, heating too quickly can cause volatile species to be trapped. When the internal pressure gets large enough, the structures can bloat, break or fracture. To curtail this effect, debinding can be accomplished by a relatively gradual increase in temperature until debinding is complete. A lack of open channels for debinding, or debinding too quickly, can also lead to a higher tendency for residual carbon formation. This in turn requires higher debinding temperatures to ensure complete debinding. When debinding is complete, the temperature can be ramped up more quickly to the firing temperature and held at that temperature until firing is complete. At this point, the articles can then be cooled.

The diluent enhances debinding by providing shorter pathways for diffusion and increased surface area. The diluent preferably remains a liquid and phase separates from the fugitive binder when the binder is cured or otherwise hardened. This creates an interpenetrating network of pockets of diluent dispersed in a matrix of hardened binder material. The faster that curing or hardening of the binder material occurs, the smaller the pockets of diluent will be. Preferably, after hardening the binder, a relatively large amount of relatively small pockets of diluent will be dispersed in a network throughout the green state structures. During debinding, the low molecular weight diluent can evaporate quickly at relatively low temperatures prior to decomposition of the other high molecular weight organic components. Evaporation of the diluent leaves behind a somewhat porous structure, thereby greatly increasing the surface area from which remaining binder material can volatilize and greatly decreasing the mean path length over which binder material must diffuse to reach these surfaces. Therefore, by including the diluent, the rate of volatilization during binder decomposition is increased by increasing the available surface area, thereby increasing the rate of volatilization for the same temperatures. This makes pressure build up due to limited diffusion rates less likely to occur. Furthermore, the relatively porous structure allows pressures that are built up to be released easier and at lower thresholds. The result is that debinding can be performed at a faster rate of temperature increase while lessening the risk of microstructure breakage. In addition, because of the increased surface area and decreased diffusion length, debinding is complete at a lower temperature.

The diluent is not simply a solvent compound for the resin. The diluent is preferably soluble enough to be incorporated into the resin mixture in the uncured state. Upon curing of the binder of the slurry, the diluent should phase separate from the monomers and/or oligomers participating in the cross-linking process. Preferably, the diluent phase separates to form discrete pockets of liquid material in a continuous matrix of cured resin, with the cured resin binding the particles of the glass frit or ceramic powder of the slurry. In this way, the physical integrity of the cured green state microstructures is not greatly compromised even when appreciably high levels of diluent are used (i.e., greater than about a 1:3 diluent to resin ratio).

Preferably the diluent has a lower affinity for bonding with the ceramic powder material of the slurry than the affinity for bonding of the binder material with the ceramic powder. When hardened, the binder should bond with the particles of the ceramic powder. This increases the structural integrity of the green state structures, especially after evaporation of the diluent. Other desired properties for the diluent will depend on the choice of ceramic powder, the choice of binder material, the choice of cure initiator (if any), the choice of the substrate, and other additives (if any). Preferred classes of diluents include glycols and polyhydroxyls, examples of which include butanediols, ethylene glycols, and other polyols.

In addition to ceramic powder, fugitive binder, and diluent, the slurry can optionally include other materials. For example, the slurry can include an adhesion promoter to promote adhesion to the substrate. For glass substrates, or other substrates having silicon oxide or metal oxide surfaces, a silane coupling agent is a preferred choice as an adhesion promoter. A preferred silane coupling agent is a silane coupling agent having three alkoxy groups. Such a silane can optionally be pre-hydrolyzed for promoting better adhesion to glass substrates. A particularly preferred silane coupling agent is a silano primer such as sold by Manufacturing Co. (3M), St. Paul, Minn. under the trade designation Scotchbond Ceramic Primer. Other optional additives can include materials such as dispersants which aid in mixing the ceramic powder with the other components of the slurry of the present invention. Optional additives can also include surfactants, catalysts, anti-aging components, release enhancers, and so on.

PDP substrates are typically soda lime glass material made by float glass processing methods. Although conventional soda lime glass is widely available at low cost, the softening temperature of such glass material has been too low for conventional PDP processing temperatures. Glass substrates for PDP applications are typically compositionally modified to raise the softening temperature. Often, this entails reducing the level of alkali material and increasing the level of alumina in the glass. The cost of soda lime glass so modified is significantly more than unmodified soda lime float glass material.

The highest processing temperature in PDP manufacturing occurs during barrier rib fabrication. With current manufacturing processes, processing temperatures greater than 560° C. are required to ensure that barrier rib materials are dense and are free of residual carbon. Although lower temperature fusing glass materials are available, the use of such materials can be prohibitive because the binder burn out temperatures are excessive. An important advantage of the method of the present invention is its use of relatively low ceramic microstructure processing temperatures, thus enabling use of low cost unmodified soda lime glass.

Electrodes can be applied on a PDP back substrate by a variety of methods including thin-film and thick film methods. Thin film methods involve physical vapor deposition of metal materials, typically Cr/Cu/Cr or Al, followed by lithography and etching to define the desired pattern. Thin film electrodes are usually less than 2 $\mu$m in thickness. Thick film method involves screen printing a silver frit material, firing to remove organic vehicles and fusing to enhance conductivity. A base alkali-free dielectric layer is also required with the thick film process since silver migration can occur on soda lime glass substrates. Thick film electrodes are typically 5 to 15 $\mu$m in thickness.

The present invention will now be illustrated by the following non-limiting examples.

EXAMPLES

Examples 1 and 2

Figure 7:
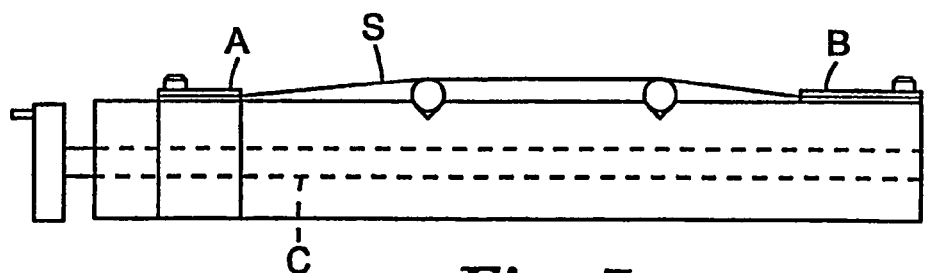
FIG. 7 is a schematic of a jig used to stretch a mold.

In the examples which follow, a jig was built to stretch a sheet of a polymer mold as shown in FIG. 7. To stretch a sheet of a polymer mold, S, the sheet was gripped at points A and B. Lateral force (in the plane of the mold) was then applied by turning a fine thread screw, C. The jig was designed to fit under a toolmaker microscope to observe the pattern of the polymer tool while stretching. Polymer mold pitch measurements were taken at various strain levels. Free-state pitch measurements were made before and after stretching to determine whether the levels of strain applied had caused plastic or elastic deformation. The polymer molds were about 2.5 cm wide and about 15 cm long.

Example 1

A polymer mold with V-groove microstructures was used. The polymer mold was a flat PET film onto which an acrylate material was cast and cured to form V-groove microstructures. The PET film was nominally 127 μm thick and the microstructure bearing acrylate layer was about 27 to 30 μm thick. In the free state, the V-groove structures were measured to be 49.556 μm apart from peak to peak.

As described above, the polymer mold was secured onto the jig to stretch in a direction parallel to the V-grooves. The V-groove spacing, or pitch, was measured at various levels of strain by visual inspection under a toolmaker microscope at 200× magnification. The results are summarized in Table 1. Loading conditions were indicated by the number of turns of screw C.

TABLE 1

| Loading condition | Pitch (μm) |
| --- | --- |
| free state | 49.556 |
| pre-load (0 turns) | 49.530 |
| 0.25 | 49.520 |
| 0.50 | 49.510 |
| 0.75 | 49.500 |
| 1.00 | 49.483 |
| 1.25 | 49.470 |
| 1.50 | 49.463 |
| post-load (0 turns) | 49.530 |

The spacing of the microstructured grooves was affected by nearly 1900 ppm (parts per million) without any observed permanent deformation (i.e., the loading history was strictly elastic). This range of control demonstrates the ability to accurately adjust patterned microstructures for alignment with a patterned substrate.

Example 2

The same procedure as in Example 1 was repeated for a polymer mold having a different construction and a different pattern. In this example, the mold had rectangular channels and was a monolithic structure made entirely of polycarbonate, one surface of which was smooth and the other surface of which had the rectangular channels. The entire mold was 550 μm thick and the channels were 198 μm deep. The channels were nominally 120 μm in width and were spaced 219.94 μm apart. S strain was applied parallel to the channels in the plane of the polymer tool. The pitch measurements are summarized in Table 2.

TABLE 2

| Strain (%) | Pitch (μm) |
| --- | --- |
| pre-load (0%) | 219.87 |
| 0.161 | 219.74 |
| 0.342 | 219.59 |
| 0.491 | 219.45 |
| post-load (0%) | 219.87 |

Similarly to Example 1, fine control of the feature pitch spacing was demonstrated by controlled stretching of the polymer mold. Again, as much as 1900 ppm of shrinkage in the pitch of the channels was obtained by elastically stretching the mold. Furthermore, the pitch of the microstructured channels was uniform along a significant portion (about 25% of the width) of the length of the polymer mold. By designing a polymer mold having a pattern that does not extend into the region near the loading points (where the film is gripped), there will be essentially no non-uniformities introduced into the mold pattern by stretching. Thus, the spacing of the pattern of the mold can be affected by stretching by the same amount at each point of the pattern.

Examples 3–7

Various concentrations of diluent in a slurry were investigated for benefits of mold release and debinding rate. The molds used were polycarbonate or photo-curable acrylate material that was cast and cured onto a high stiffniess backing material such as PET. The cast and cured polycarbonate or acrylate material formed the patterned surface of the mold. Cure shrinkage of the slurry and chemical interaction between the slurry and the polymer mold can cause difficulty with demolding. Bonding between the slurry and mold can result in longer processing times, fracturing of the cured microstructures, or mold failure. Enhancing the demolding characteristics is desirable to improve molding yield and to prolong the life of the mold as well as to yield higher fidelity replicated structures. For PDP barrier rib manufacturing, the ability to quickly fire the ribs is desirable to reduce cycle time and cost. The binder must debind, or burn out, quickly and completely to achieve fast firing. Proper design and incorporation of a diluent component into the slurry of the present invention can enhance both demolding and debinding.

A photocurable resin active in the visible light region was used as the binder in preparing the slurry samples in Examples 3–7. Glass frit was used as the glass powder of the slurry. The glass frit was a lead borosilicate glass powder as commercially available from Asahi Glass Co. under the trade designation RFW030, and had an average particle size of 1.2 μm. The base resin was composed of 50% by weight bisphenol-a diglycidyl ether dimethacrylate (BISGMA) and 50% by weight triethylene glycol dimethacrylate (TEGDMA). An initiator system which allows curing using visible light in the blue region of the spectrum was used and was composed of ethyl dimethylaminobenzoate, camphoroquinone, and diphenyl iodonium hexafluorophosphate. The initiator level was kept at 2% by weight of the organic components for all the samples. Glass frit loading in all the slurries were about 45% to 47% by volume. A phosphate ester dispersant was used to help incorporation of the glass frit into the organic components. Curing was performed using a blue light (380–470 nm) source irradiated through the glass substrate used. Dosage was between 1 to 1.5 J/cm². The diluent selected for Examples 3–7 was 1,3 butanediol. 1,3 butanediol is not soluble in the BISGMA alone, but is soluble in the BISGMA/TEGDMA mixture. The diluent content in percentage by weight of the organic components was as shown in Table 3.

TABLE 3

| Example | Diluent (% by weight) |
| --- | --- |
| 3 | 10 |
| 4 | 20 |
| 5 | 30 |
| 6 | 35 |
| 7 | 40 |

Debinding Properties

To study effects on binder burn out, thick films of the slurry according to Examples 3–7 were prepared on glass substrates for firing. The glass substrates were 2.5 mm thick soda lime glass as commercially available from Libbey-Owens-Ford Co., Toledo, Ohio. A knife coater was used to cast a uniform slurry layer onto the glass substrates. The knife coater gap was set at 200 μm. The coatings were cured with a blue light for 1 minute. The samples were then fired in a box furnace having an air flow of 30 scfh (standard cubic feet per hour). The firing schedule was 5° C. per minute to 540° C. for a 20 min soak. The samples were then cooled at 2 to 3° C. per minute to room temperature. After firing, the fused layers were about 70 to 80 μm thick. The 10% sample, the formulation of Example 3, was severely cracked to a point at which the fragments did not adhere to the glass substrate after firing. The formulation of Example 4, the 20% diluent sample, also cracked, but remained adhered to the substrate. The formulations of Examples 5, 6, and 7 remained intact without cracking and were adhered to the substrate. These results indicate that higher diluent concentrations in a slurry allow more facile binder burn out, presumably due to evaporation of the diluent leaving more pathways for debinding so that internal gas pressure from volatilization, which might otherwise cause fracturing, can be relieved.

Mold Release Properties

Mold release after curing was studied quantitatively with a peel tester commercially available from Instramentors, Inc., Strongville, Ohio, under the trade designation Model SP-102C-3M90. Sheets of a polymer mold having rectangular channels were used for forming rib structures from the glass slurries of Examples 3–7 onto soda lime glass substrates. The channels in the mold were nominally 75 μm wide, 185 μm deep, and 220 μm in pitch spacing. Sample fabrication involved laminating the glass slurry samples between the glass substrate and the mold, followed by curing the samples. The slurry essentially filled the channels of the mold during lamination to thereby replicate the mold features onto the glass substrate after curing. The molds were about 2.5 cm wide by about 22 cm long. The channels were parallel to the long dimension of the molds. After lamination, the samples were cured using a blue light source for a dosage of 1–1.5 J/cm$^2$. After curing, the molds were released by peeling along the direction of the channels and the peel force was measured. Peel test was performed at 90° to the substrate and at a speed of about 20 cm per minute. The average peel force measurements are shown in Table 4.

TABLE 4

| Example | Diluent (% by weight) | Peel Force (kg/cm) |
|---------|----------------------|--------------------|
| 3 | 10 | mold failure |
| 4 | 20 | 0.71 |
| 5 | 30 | 0.47 |
| 6 | 35 | 0.16 |
| 7 | 40 | 0.10 |

The formulation of Example 3 did not give conclusive results because the adhesion to the mold was so strong that the mold tore in the peel process. The benefit of the diluent in enhancing mold release is evident from Table 4. However, note that at very high diluent levels, the physical integrity of the cured green state structures can be degraded significantly due to the relatively high liquid content. The formulation of Example 7 showed some defects after curing due to breakage of the green state structures. The formulations of Examples 4, 5, and 6, representing diluent contents above 10% and below 40%, exhibited the best combination of green state physical integrity and mold release properties.

Example 8

A spatula was used to mix an epoxy binder with 82.3% by weight (43.3 volume %) of yttria-stabilized zirconia powder (commercially available from Zirconia Sales America, grade HSY-3B). The average particle size in the zirconia powder size was 0.4 microns. The epoxy binder was mixed with a diluent and a surfactant in amounts of 54.2% by weight epoxy, 36.4% by weight diluent and 9.4% by weight surfactant. The epoxy was a blend of bisphenol A epoxide (commercially available from Celanese Corp., Louisville, Ky., under the trade designation Celanese DER 332) and an amine curing agent (commercially available from Celanese Corp. under the trade designation Epi-cure 826). The curing agent level was 26% by weight of the epoxy. The diluent system was a blend of 65% by weight of 1,3 butanediol (commercially available from Aldrich Chemical Co., Milwaukee, Wis.) and 35% by weight of polyethylene glycol (commercially available from Sigma Chemical, St. Louis, Mo., under the trade designation Carbowax 200). The polyethylene glycol served to solubilize the butanediol in the epoxy. The surfactant was a material commercially available from ICI Americas Inc., New Castle, Del., under the trade designation hypermer KD1. The surfactant served to help incorporate the zirconia powder in the resin. The slurry was molded onto a plastic substrate, transferred onto an alumina substrate, and then debinded by heating to 600° C. at a rate of 5° C. per minute. The material was then fired by ramping the temperature to 1400° C. at a rate of 10° C. per minute and held there for 1 hour.

The slurry of Example 8 can be made by mixing the following materials in the following amounts:

| | |
|---|---|
| 51.0 g | yttria-stabilized zirconia powder |
| 4.40 g | bisphenol A epoxide |
| 1.56 g | curing agent |
| 2.60 g | polyethylene glycol |
| 1.40 g | 1,3 butanediol |
| 1.02 g | surfactant |

Example 9

An acrylate binder was mixed with 85.5% by weight of yttria stabilized zirconia powder. The zirconia powder was a bimodal blend of grade HSY-3B (as used in Example 8) with 12.3% by weight of grade HSY-3U as commercially available from the same company. Grades HSY-3B and HSY-3U have respective average particle sizes of 0.4 and 0.1 microns. The binder was 50.5% of an acrylate resin (described below), 44.4% by weight diluent and 5.0% by weight surfactant. Specifically, the resin was a blend of 50% by weight bisphenol A diglycidyl ether dimethacrylate (BIS-GMA) and 50% by weight triethylene glycol dimethacrylate (TEGMA). The cure initiator was a mixture of ethyl dimethylaminobenzoate, camphoroquinone and diphenyl iodonium hexafluorophosphate. The initiator level was 2% by weight of the acrylate base resin. The diluent was 50% by weight diallyl phthalate and 50% by weight butyl strearate. The diallyl phthalate plasticizer in the diluent served to reduce resin viscosity for improving moldability and to solubilize the butyl stearate in the acrylate resin. The butyl strearate in the diluent allowed for phase separation of the diluent upon curing of the binder to aid mold release and allow speedy egress of the binder material during debinding. The surfactant (available from ICI Americas under the trade designation hypermer KD1) was used to incorporate the zirconia powder into the binder. The slurry was molded onto a glass substrate and cured by exposure to blue light through the substrate and through the mold for 2.5 minutes before being demolded from the polymer mold that was used. The debinding and firing schedule was the same as used in Example 8.

The slurry of Example 9 can be made by mixing the following materials in the following amounts:

| | |
|---|---|
| 510.10 g | yttria stabilized zirconia powder grade HSY-3B |
| 71.50 g | yttria stabilized zirconia powder grade HSY-3U |
| 50.00 g | 50/50 BISGMA/TEGMA blend |
| 22.20 g | diallyl phthalate |
| 22.20 g | butyl stearate |
| 5.00 g | surfactant |

Example 10

A uv curable oligomeric composition was used to form a microstructured flexible mold. The composition was a mixture of 99% by weight of the aliphatic urethane acrylate, Photomer 6010, and 1% by weight of a photoinitiator commercially available from Ciba Specialty Chemicals under the trade designation Darocur 1173. The oligomeric resin was heated to about 60° C. to lower the viscosity to about 2500 centipoise. The resin was poured along one edge of a metal tool having a positive ribbed microstructure suitable for use in PDP barrier rib formation and overlaid with a polyester film having a 5 mil thickness. The stack was pulled between the flat surface on which the stack was placed and a metal roller mounted on a frame above the stack. The gap between the flat surface and the roller was adjusted such that the distance between the metal tool and the polyester film was about 0.001 inches. As the stack was pulled through the gap, the oligomeric resin was forced into the microstructure of the tool and spread across the tool. The stack was irradiated through the polyester substrate using three passes under a medium-pressure mercury lamp for a dosage in the range of 200 to 400 mJ/cm$^2$. The resulting microstructured mold was peeled away from the metal tool to provide a nearly exact negative of the microstructure present on the metal tool.

Example 11

A uv curable oligomeric composition was used to form a microstructured flexible mold. The composition was a mixture of 75% by weight of the aliphatic urethane acrylate, Photomer 6010, 24% by weight of 1,6-hexanediol diacrylate, and 1% by weight of the photoinitiator Darocur 1173. The oligomeric resin was heated to about 60° C. to lower the viscosity to about 1000 centipoise. The resin was poured along one edge of a metal tool having a positive ribbed microstructure and overlaid with a polyester film having a 5 mil thickness. The stack was pulled between the flat surface on which the stack was placed and a metal roller mounted on a frame above the stack. The gap between the flat surface and the roller was adjusted such that the distance between the metal tool and the polyester film was about 0.001 inches. As the stack was pulled through the gap, the oligomeric resin was forced into the microstructure of the tooling and spread across the metal tool. The stack was irradiated through the polyester substrate using three passes under a medium-pressure mercury lamp for a dosage in the range of 200 to 400 mJ/cm$^2$. The resulting microstructured mold was peeled away from the metal tool to reveal, upon further examination, distorted microstructures with concave shaped sidewalls and slanted tops.

Example 12

The following is an example of compression molding to form patterned microstructured molds for use in the present invention. A sample was prepared for compression molding by sequentially stacking the following: a cardboard sheet, a chrome-plated brass plate, a 9 inch by 13 inch microstructured metal tool, four sheets of 0.0055 inch thick polycarbonate film (available from the Bayer Corp. under the trade designation Makrolon 2407), followed by a second chrome plated brass plate, and a second cardboard sheet.

The stack was placed in a compression molder (as commercially available from Wabash MPI, Wabash, Id., under the trade designation Model V75H-24-CLX), which was heated to 190° C. The stack was compressed at 5000 lbs loading force for 2 minutes. The load was increased to 40,000 lbs for an additional 2 minutes, followed by cooling to approximately 80° C. under pressure. The stack was removed from the molder and disassembled to provide a microstructured mold.

What is claimed is:

1. An electronic display assembly comprising a glass substrate, a plurality of independently addressable electrodes patterned on the glass substrate, and a plurality of ceramic barriers molded and aligned on the glass substrate wherein the ceramic barriers and the electrodes each have a pitch with a mismatch of no greater than 0.01% wherein the assembly is prepared by a process comprising:
   providing a mixture comprising a ceramic powder disposed in a curable binder;
   placing the mixture between the glass substrate and a patterned surface of a mold;
   stretching the mold to align a portion of the patterned surface of the mold with the electrodes of the glass substrate;
   curing the curable binder to a rigid state such that the binder is adhered to the glass substrate; and removing the mold.

2. The electronic display assembly of claim 1, wherein the step of placing the mixture between the glass substrate and the patterned surface of the mold comprises coating the glass substrate with the mixture and bringing the patterned surface of the mold in contact with the mixture.

3. The electronic display assembly of claim 1, wherein the step of curing forms hardened material comprising microstructures that substantially replicate the patterned surface of the mold.

4. The electronic display assembly of claim 3, wherein the hardened material further comprises a land between the structures and the substrate.

5. The electronic display assembly of claim 1, wherein the ceramic barriers comprise a series of substantially parallel ridges.

6. The electronic display assembly of claim 5, wherein the step of stretching the mold comprises mechanically expanding the mold in a direction parallel to the ridges.

7. The electronic display assembly of claim 5, wherein the step of stretching the mold comprises mechanically expanding the mold in a direction perpendicular to the ridges.

8. The electronic display assembly of claim 1, wherein the step of stretching the mold comprises mechanically pulling the mold in a single direction lateral to the glass substrate.

9. The electronic display assembly of claim 1, wherein the step of stretching the mold comprises heating the mold in a substantially uniform fashion to thereby expand the mold.

10. The electronic display assembly of claim 1, wherein the step of curing the curable binder comprises exposing the slurry to ultraviolet or visible light radiation through the substrate, through the mold, or through both the substrate and the mold.

11. A high definition television screen assembly including a plasma display panel comprising:
a back glass substrate having a plurality of independently addressable electrodes forming a pattern;
a plurality of ceramic microstructured barriers molded and aligned with the electrode pattern on the back substrate wherein the ceramic barriers and electrodes each have a pitch with a mismatch of no greater than 0.01% and the panel is prepared according to a process comprising
providing a mixture comprising a ceramic powder disposed in a curable binder,
placing the mixture between the glass substrate and a patterned surface of a mold,
stretching the mold to align a portion of the patterned surface of the mold with the electrodes of the glass substrate,
curing the curable binder to a rigid state such that the binder is adhered to the glass substrate, and removing the mold;
phosphor powder deposited between the ceramic barriers;
a front glass substrate having a plurality of electrodes, the front substrate mounted with its electrodes facing the electrodes on the back substrate; and
an inert gas disposed between the front and back substrates.

12. The television screen of claim 11, wherein the step of curing forms hardened material comprising microstructures that substantially replicate the patterned surface of the mold.

13. The television screen of claim 12, wherein the hardened material further comprises a land between the structures and the substrate.

14. The television screen of claim 11, wherein the ceramic barriers comprise a series of substantially parallel ridges.

15. The television screen of claim 14, wherein the step of stretching the mold comprises mechanically expanding the mold in a direction parallel to the ridges.

16. The television screen of claim 15, wherein the step of stretching the mold comprises mechanically expanding the mold in a direction perpendicular to the ridges.

17. The television screen of claim 11, wherein the step of stretching the mold comprises mechanically pulling the mold in a single direction lateral to the glass substrate.

18. The television screen of claim 11, wherein the step of stretching the mold comprises heating the mold in a substantially uniform fashion to thereby expand the mold.

19. The television screen of claim 11, wherein the step of curing the curable binder comprises exposing the slurry to ultraviolet or visible light radiation through the substrate, through the mold, or through both the substrate and the mold.

* * * * *

UNITED STATES PATENT AND TRADEMARK OFFICE
CERTIFICATE OF CORRECTION

PATENT NO. : 6,984,935 B2
DATED : January 10, 2006
INVENTOR(S) : Chiu, Raymond C.

It is certified that error appears in the above-identified patent and that said Letters Patent is hereby corrected as shown below:

<u>Title page,</u>
Item [56], References Cited, U.S. PATENT DOCUMENTS, delete "4,322,576, 3/1982 Miller et al." and insert -- 4,332,576, 06/1982, Stecklein et al. --.

<u>Column 4,</u>
Line 24, delete "micro structures." and insert -- microstructures. --.

<u>Column 20,</u>
Line 15, delete "stiffniess" and insert -- stiffness --.

Signed and Sealed this

Seventh Day of March, 2006

JON W. DUDAS
*Director of the United States Patent and Trademark Office*